Aug. 12, 1969      E. C. CREUTZ      3,460,318
CENTRIFUGAL MOLECULE SEPARATOR
Filed Dec. 14, 1966

Inventor
EDWARD C. CREUTZ

By Anderson, Luedeka, Fitch, Even, & Tabin   Attys.

United States Patent Office 3,460,318
Patented Aug. 12, 1969

3,460,318
CENTRIFUGAL MOLECULE SEPARATOR
Edward C. Creutz, Rancho Santa Fe, Calif., assignor by mesne assignments, to Gulf General Atomic Incorporated, San Diego, Calif., a corporation of Delaware
Filed Dec. 14, 1966, Ser. No. 601,702
Int. Cl. B01d 57/00
U.S. Cl. 55—17
6 Claims

ABSTRACT OF THE DISCLOSURE

A method and apparatus for separating gases of different molecular masses including a helical or spiral capillary passageway, means for flowing a mixture of gases through the passageway, and means for removing gas fractions from the outer and/or inner surface of the passageway. The velocity of the gas mixture is sufficient to provide a centrifugal force field of at least about $10^5$ g., but is less than the critical velocity above which flow within the passageway becomes substantially turbulent.

---

Figure 1:
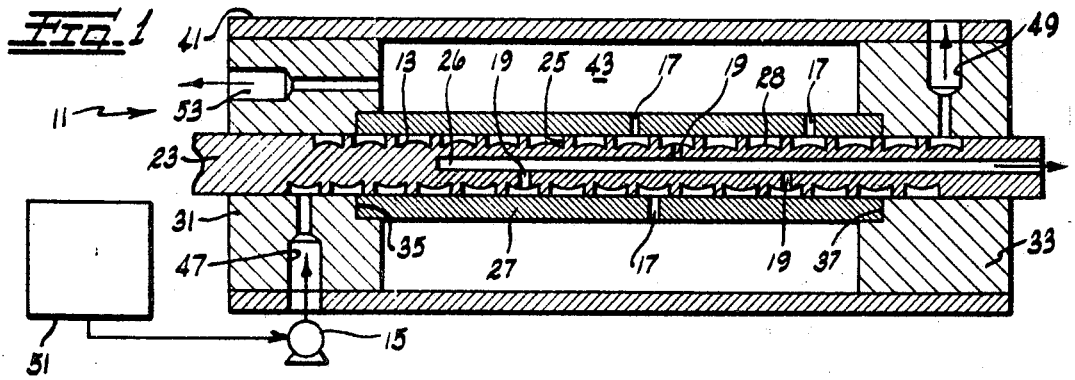

This invention relates generally to a method and apparatus for separating gases, and more particularly, it relates to a method and apparatus for separating gases having different molecular masses.

Various methods and apparatus are well-known for separating gases or gas fractions from a mixture of gases. Gases which have substantially different chemical and/or physical properties are most easily separated. Usual methods and apparatus for separating gases having dissimilar chemical and/or physical properties include liquefaction, adsorption, absorption, and chemical reaction.

Gases which have similar chemical and physical properties, e.g., gaseous isotopes, are not so easily separated. Particularly, gases having similar chemical properties are not readily separated by liquefaction, adsorption, absorption or chemical reaction.

If the gases which are desired to be separated from a mixture of gases have different molecular masses, this characteristic of the gases can be employed to effect a separation of the gases. Diffusion processes and electromagnetic processes have been used for separating gases which have different masses and which cannot be separated by more conventional methods. A process which rotates the mixture of gases in a centrifuge has also been used. However, the previously used processes for separating gases of dissimilar molecular masses generally require complex and expensive equipment, and require careful control to effect the desired separation.

It is a principal object of the present invention to provide a method and apparatus for separating gases. Another object is to provide a method and apparatus for separating gases having different molecular masses. A further object is to provide a method and apparatus for separating gases which is compact, economical to construct, and simple to operate.

Figure 2:
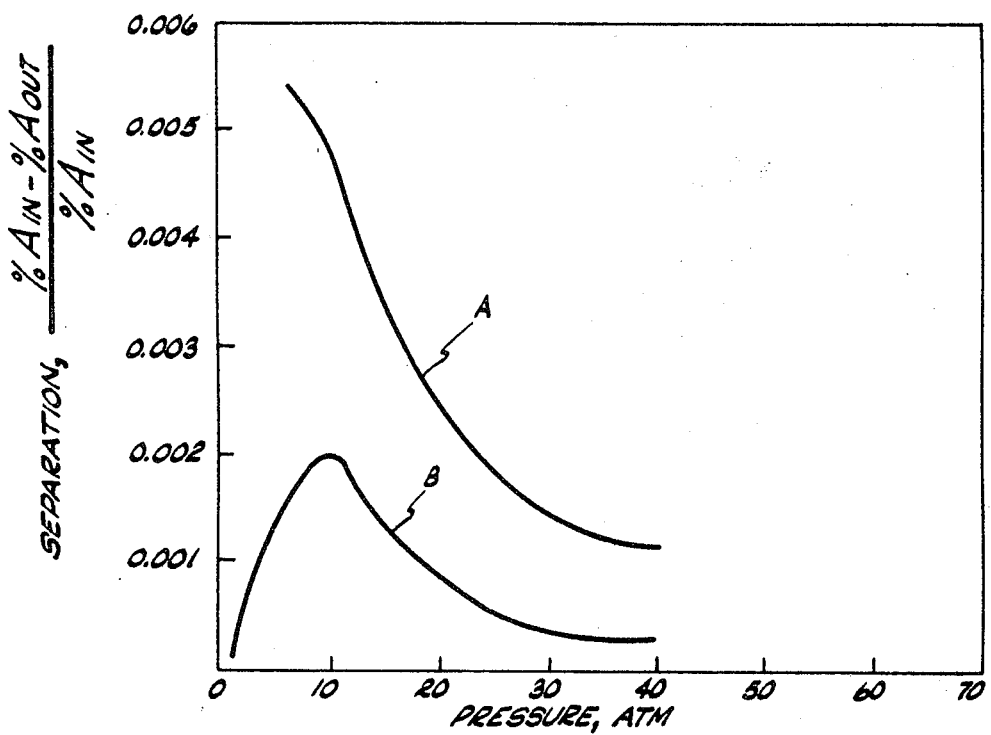

These and other objects of the invention will be perceived from the following detailed description and from the drawing in which:

FIGURE 1 is a cross-sectional view of a particular embodiment of the apparatus of the present invention; and FIGURE 2 is a graph showing the degree of separation of argon from a mixture of argon and helium using a specific apparatus constructed in accordance with the invention.

Very generally, and having reference to FIGURE 1 of the drawing, the present invention is directed to an apparatus 11 for separating gases of different molecular mass which includes a helical or spiral capillary passageway 13. Means 15 are provided for flowing a mixture of gases having different molecular masses through the helical passageway at a velocity sufficient to exert a centrifugal force field upon the gaseous mixture in the helical passageway, and to cause the gas mixture to separate into light and heavy gas fractions. Means 17 and/or means 19 are provided for removing fractions of gases adjacent the outer and inner surface of the helical passageway respectively, as may be desired.

The present invention also contemplates a method of separating gases of different molecular mass which includes flowing a mixture of gases having different molecular masses through a shaped helical passageway at a velocity sufficient to cause the gases to separate into heavier and lighter fractions, and withdrawing fractions of the gases from the inner and/or outer surfaces of the helical passageway, as may be desired.

It has been discovered that it is possible to exert a large centrifugal force field upon gases by flowing a gaseous mixture through a helical capillary passageway. When a large centrifugal force field is exerted on a gas mixture containing gases of different molecular mass, the gas molecules having the greater mass tend to congregate at the outer regions of the force field since these molecules experience the greatest centrifugal force. When the force field is created by flowing a gas mixture through a helical passageway the heavier gas molecules tend to congregate adjacent to the outer-most surface of the helical passageway, that is, at the surface of the helical passageway which is the furthest from the axis of the helix. Conversely the gas molecules having the least mass tends to congregate along the inner-most surface of the helical passageway.

The degree of separation of gases of different masses by flowing a gas mixture through a helical passageway at a velocity sufficient to create a large centrifugal force field is at least partially dependent upon the flow characteristic of the gas mixture in the helical passageway. It is apparent that if the velocity of the gas mixture is such that the flow characteristic of the gas mixture is completely turbulent there will be sufficient mixing within the helical passageway that a significant separation cannot take place. At the same time, however, the velocity of the gas mixture through the helical passageway must be sufficient to create the desired centrifugal force field.

The flow characteristic of a fluid flowing through a closed channel of any cross-section is usually defined by its Reynolds number, a dimensionless group, which is a function of the size of the channel, the velocity of the fluid, the density of the fluid and the viscosity of the fluid. For straight circular pipe, at Reynolds numbers less than about 2100 the flow is laminar, i.e., viscous, and follows Poiseuille's law. At Reynolds numbers above about 2100 the flow will be turbulent in straight circular pipe.

For curved pipe, the Reynolds numbers defining transition from laminar flow to turbulent flow may vary widely from those associated with flow in straight pipe. When the pipe is in the form of a helix it has been determined that Reynolds number can greatly exceed 2100 without causing turbulent flow.

It has been determined that best results are obtained when the helical passageway has a noncircular cross-section having one or two convex sidewalls. Rectangular or square cross-sections having one or two convex sidewalls are generally preferred, but a circular cross-section is permissible. Another cross-sectional shape which might be desirable is a dumbbell shape.

In order to obtain a significant separation of gases having different masses in accordance with the invention, the centrifugal field exerted upon the gaseous mixture in the helical passageway should be at least about $10^5$ g. For some gas mixtures this figure might be higher or slightly lower depending upon the difference in the molecular masses of the gases being separated. The degree of separation generally increases with increasing centrifugal fields up to the point where turbulence becomes large. Gas velocities within the range of between about $4.6 \times 10^3$ cm./sec. and about $3.2 \times 10^4$ cm./sec. have been utilized with success. These velocities provide centrifugal fields as high as $10^7$ g.

The dependence of the separation upon the strength of the centrifugal field can be seen from FIGURE 2, where at low pressures with the helical passageway, i.e., at low gas velocity, there is negligible separation of the gases of different mass. When the pressure in the helical passageway is increased, i.e., when the gas velocity is increased, the centrifugal force field increases and an advantageous separation occurs. However, as seen in FIGURE 2 when the pressure is increased to the point where the critical velocity is reached turbulent flow occurs in the helical passageway and the degree of separation decreases. This is because the turbulent flow causes mixing within the helical passageway, which action opposes the tendency of the heavier molecules to congregate adjacent to the outer-most surface of the helical passageway and the lighter molecules to congregate adjacent to the inner-most surface of the helical passageway.

Referring now to the drawing in detail, FIGURE 1 is a cross-sectional view of a specific embodiment of an apparatus 11 constructed in accordance with the present invention. In the preferred embodiment illustrated, the apparatus 11 is cylindrical in shape and includes a central cylindrical rod 23. In a specific embodiment, the rod 23 may have a diameter of 0.098 inch and a length of two inches. The cylindrical rod 23 may be provided with a central bore 26 for withdrawing a gas fraction as discussed hereinafter.

The cylindrical rod 23 is provided with a helical groove 25. The groove 25 illustrated in FIGURE 1 has an approximately rectangular cross-section, and the bottom wall of the groove has a convex curved surface 28. In a specific embodiment the groove 25 may have a depth of 0.012 inch and a width of 0.04 inch with 0.02 inch between grooves. The convex surface 28 may protrude 0.004 inch into the groove at its apex.

A cylindrical sleeve 27 surrounds an intermediate portion of the cylindrical rod 23 in sealing engagement therewith. The sleeve 27, together with the helical groove 25 in the cylindrical rod 23 defines the helical passageway 13. The helical passageway 13 is preferably a small passageway. The helical passageway has a length sufficient that the gaseous mixture is subjected to the centrifugal field for a period of time sufficient to cause a desired separation. Good results have been obtained when the helical passageway had a length of eleven centimeters and it is contemplated that much longer passageways might be used if sufficient pressures are provided for flowing the gases through the passageway.

The cylindrical rod 23 is axially supported adjacent its ends in cylindrical end blocks 31 and 33 having a diameter of, for example, three fourths inch. The end blocks 31 and 33 may be connected to the cylindrical rod 23 by any convenient means, such as welding, and in the illustrated embodiment the helical groove 25 extends over a portion of the rod 23 which is received in the end blocks 31 and 33 at shoulders 35 and 37 provided in the respective end blocks so that the end blocks 31 and 33 also cooperate with the helical groove 25 in the cylindrical rod 23 to form the initial and terminal sections of the helical passageway 13.

The end blocks 31 and 33 are axially received within a cylindrical casing 41 and sealed therewith. The casing 41 is spaced from the sleeve 27 by virtue of the larger diameter of the end blocks 31 and 33 and defines with the sleeve 27 an annular chamber 43 between the end blocks 31 and 33.

A radial inlet bore 47 is provided through the casing 41 and the end block 31 in communication with the helical passageway 13. A similar radial outlet bore 49 is provided through the casing 41 and the end block 33 in communication with the helical passageway 13. The gaseous mixture to be separated is flowed through the inlet bore 47, through the helical passageway 13 and out the outlet bore 49 at a sufficient velocity to create a desired centrifugal field. In the embodiment illustrated in FIGURE 1, a source 51 of the gaseous mixture to be separated in supplied to the inlet bore 41 through a conventional piping arrangement. A means 15 for flowing the gaseous mixture through the helical passageway 13 is provided, and in the embodiment illustrated in FIGURE 1 takes the form of a pump which forces the mixture of gases through the helical passageway under pressure. Alternately, the means 15 might comprise a source of vacuum connected to the outlet bore 49, or a combination of both a source of pressure and a source of vacuum.

As previously indicated, it is generally desirable to flow the gaseous mixture through the helical passageway at a velocity sufficient to create a centrifugal field of at least about $10^5$ g. It is usually most convenient to measure the velocity by the pressure and the mass flow rate within the helical passageway.

In order to withdraw desired fractions of gases while the centrifugal force field is exerted on the gaseous mixture, the means 17 and/or 19 are provided in the outer-most and inner-most surface respectively of the helical passageway.

In the illustrated embodiment of FIGURE 1, the means 17 is in the form of a plurality of radial holes 17 extending through the sleeve 27 between the outer-most surface of the helical passageway 13 and the annular chamber 43. The heavier gas fraction which collects at the outer-most surface of the helical pasagessway when the gas mixture is subjected to the centrifugal force field passes through the holes 17 into the annular chamber 43. The heavier gas fraction may be removed from the chamber 43 through an axial bore 53 in the end block 31, or in any other desired manner.

Further, in accordance with the illustrated embodiment of FIGURE 1, the lighter gas fraction collected from the inner-most surface of the helical passageway passes through the passages 19 into the central bore 26 within the rod 23. The gases may be collected from the central bore 23 by any suitable means, not shown.

It is apparent that if only heavier fraction of gases is desired the means 19 may be omitted. In the illustrated embodiment, the central bore 26 in the rod 23 can also be omitted if there is no desire to collect the lighter gas fractions.

It is also contemplated to provide the means 17 and 19 in the form of porous surfaces as opposed to the illustrated apertures. In this connection, the porous surfaces might be selected to pass both the heavier and lighter gas molecules, or in some circumstances might be selective in nature and preferentially allow a single type molecule to pass therethrough. In some instances, the use of porous surfaces may be desirable where the presence of the holes 17 and 19 may create turbulence in the helical passageway.

It is also contemplated that the apparatus of the present invention may take other forms than that illustrated in the drawing. The apparatus having a uniform radius of curvature is preferred, however separation may also be achieved using apparatus having a non-uniform radius of curvature.

It is also contemplated to connect a series of the apparatus of the present invention together to form a plurality of stages of separation. Any number of individual apparatus might be connected together in order to form a combined system for effecting greater separation of one or more gas fractions.

The method and apparatus of the present invention are suited for use in separating many gases having different molecular masses. In general, it is preferred that the gases be noncondensible under the conditions necessary to effect separation. Examples of suitable mixtures of gases include mixtures of helium and argon, mixtures of helium and nitrogen, mixtures of $He^3$ and $He^4$, mixtures of hydrogen and deuterium, as well as mixtures of other gaseous isotopes.

FIGURE 2 illustrates results obtained in the separation of argon from a 50 percent helium —50 percent argon mixture using the method and apparatus of the invention. The particular apparatus used includes spiral rectangular helical capillary pasasgeway having a convex inner-most wall made by cutting a spiral groove in a rod 0.098 inch in diameter. The depth of the spiral groove was about 0.01 inch. The rod was then covered with a sleeve which included two passages extending therethrough into communication with the helical passageway through which gas samples were withdrawn.

The separation was measured using a gas chromatograph connected to a digital voltmeter. Samples of gas were taken from the inlet to the apparatus and from the passages in the sleeve. The differences in percentage of the heavier gas, argon, were used to calculate the separation. the sampling and testing method employed has an accuracy of about 0.01 percent.

Curve A in FIGURE 2 shows the separation of argon from the argon and helium mixture as a function of the pressure in the helical passageway. Curve A represents the data collected after making a theoretical correction for the effect of diffusion through the passages in the sleeve which diffusion tends to decrease the measured separation since helium diffuses more readily than does argon. It is believed that this is probably an over correction.

Curve B represents the same data with a correction for diffusion made from an actual measured diffusion of the gas mixture through the passages in the sleeve under no flow, with no centrifugal field present. Curve B illustrates that at low pressure a negligible and perhaps negative separation is observed, that is, the gas obtained from the sampling holes in the sleeve contains more helium than argon. This is believed to be due to the fact that at low pressure, diffusion is the main process by which gas passes out of the small sampling holes, and the lighter helium molecules diffuse more rapidly than the heavier argon molecules. As the pressure is increased, the diffusion flow through the sampling holes is decreased, the flow becomes viscous and the true separation is observed. At higher pressures and correspondingly higher velocity, the separation decreases. This is believed to be caused by turbulence within the helical passageway.

It is believed that the actual separation of the gases within the helical passageway probably lies somewhere between the two curves, that is, some place between that indicated by the two methods of correction which were selected.

It can be seen that a simple and useful method and apparatus have been disclosed for separating gases of different molecular mass. Although certain embodiments have been disclosed with particularity in order to fully describe the invention, various alternative embodiments within the skill of the art are contemplated.

Various of the features of the invention are set forth in the following claims.

What is claimed is:

1. An apparatus for separating gases of different molecular mass comprising a rod-like member having a helical grooved capillary passageway therein, said passageway having a generally noncircular cross-section and having at least one convex sidewall, means for flowing a mixture of gases to be separated through said passageway at a velocity sufficient to cause separation of the gas mixture within the helical passageway, and means for withdrawing gas fractions of different mass from the helical passageway.

2. An apparatus in accordance with claim 1 wherein the helical passageway has a generally rectangular cross-section and the inner-most wall of the helical passageway is convex.

3. An apparatus in accordance with claim 2 wherein the helical passageway is formed from a rod-like member having a helical groove therein, and a sleeve surrounding said rod.

4. An apparatus in accordance with claim 3 wherein the ends of said rod are axially supported in cylindrical end blocks, and a concentric cylindrical casing is provided around said end blocks defining an annular chamber surrounding said sleeve.

5. A method of separating gases of different molecular mass comprising, flowing a mixture of gases to be separated through a shaped helical capillary passageway at a velocity sufficient to exert a centrifugal force of at least $10^5$ g. on the gas mixture to cause separation of the gas mixture into fractions of different mass within the helical passageway while maintaining the velocity of the gas mixture below the critical velocity above which there is substantially turbulent flow in the helical passageway, and withdrawing the gas fractions from the helical passageway.

6. A method in accordance with claim 5 wherein the velocity is between about $4.6 \times 10^3$ and about $3.2 \times 10^4$ cm./sec.

References Cited

UNITED STATES PATENTS

| | | | |
|---|---|---|---|
| 2,413,324 | 12/1946 | Holzwarth | 55—452 |
| 2,951,554 | 9/1960 | Becker | 55—17 |
| 3,201,919 | 8/1965 | Long | 55—191 |
| 3,204,696 | 9/1965 | De Priester et al. | 55—456 |
| 3,299,616 | 1/1967 | Lucas | 55—17 |

REUBEN FRIEDMAN, Primary Examiner

C. N. HART, Assistant Examiner

U.S. Cl. X.R.

55—456